US011860023B2

(12) United States Patent
Dieterle

(10) Patent No.: US 11,860,023 B2
(45) Date of Patent: Jan. 2, 2024

(54) RADAR SENSOR FOR FILL LEVEL OR POINT LEVEL MEASUREMENT

(71) Applicant: VEGA Grieshaber KG, Wolfach (DE)

(72) Inventor: Levin Dieterle, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 349 days.

(21) Appl. No.: 16/528,132

(22) Filed: Jul. 31, 2019

(65) Prior Publication Data
US 2020/0041324 A1 Feb. 6, 2020

(30) Foreign Application Priority Data

Aug. 2, 2018 (EP) ..................................... 18187126

(51) Int. Cl.
*G01F 23/284* (2006.01)
*G01S 7/02* (2006.01)

(52) U.S. Cl.
CPC ............ *G01F 23/284* (2013.01); *G01S 7/027* (2021.05)

(58) Field of Classification Search
CPC ....... G01F 23/284; G01S 7/027; H01Q 1/225; H01Q 1/42
See application file for complete search history.

(56) References Cited

U.S. PATENT DOCUMENTS

| 5,730,025 A | 3/1998 | Getman et al. | |
| 10,180,343 B2* | 1/2019 | Merker | G01S 7/521 |
| 10,378,948 B2 | 8/2019 | Skowaisa et al. | |
| 2004/0055376 A1* | 3/2004 | Thompson | G01F 1/6845 |
| | | | 73/204.22 |

(Continued)

FOREIGN PATENT DOCUMENTS

| CN | 1643348 A | 7/2005 |
| DE | 10 2016 101 756 A1 | 8/2017 |

(Continued)

OTHER PUBLICATIONS

Combined Chinese Office Action and Search Report dated Oct. 9, 2021 in Patent Application No. 201910711501.3 (with English translation of Categow of Cited Documents), 7 pages.

(Continued)

*Primary Examiner* — Peter M Bythrow
*Assistant Examiner* — Nazra Nur Waheed
(74) *Attorney, Agent, or Firm* — Oblon, McClelland, Maier & Neustadt, L.L.P.

(57) ABSTRACT

A radar sensor for measuring a fill level and/or a point level of a product in a container is described, including a sensor configured to emit and/or to receive a radar signal; evaluation circuitry configured to determine a measurement signal; a housing having at least one housing region configured such that the radar signal can be transmitted through the housing region; an adhesive surface including an adhesive material, configured to attach the radar sensor to the container wall, is disposed on the outside of the housing at least along a portion of an outer circumference of the housing region, and a sealing surface including a sealing material configured to at least partially seal the housing region when the radar sensor is attached to the container wall, the sealing surface being disposed on the outside of the housing at least along a portion of the outer circumference of the housing region.

16 Claims, 5 Drawing Sheets

(56) References Cited

U.S. PATENT DOCUMENTS

| | | | |
|---|---|---|---|
| 2005/0225480 A1* | 10/2005 | Fehrenbach | G01S 7/032 |
| | | | 73/290 R |
| 2013/0009803 A1 | 1/2013 | Edvardsson | |
| 2014/0047917 A1* | 2/2014 | Vogt | H01Q 1/42 |
| | | | 333/252 |
| 2018/0212316 A1* | 7/2018 | Janitch | G01F 23/284 |
| 2019/0316951 A1* | 10/2019 | McCormick | G01F 23/2845 |

FOREIGN PATENT DOCUMENTS

| | | | |
|---|---|---|---|
| EP | 1 493 003 A1 | 1/2005 | |
| EP | 1764591 A2 * | 3/2007 | G01F 23/284 |
| EP | 2260273 B1 * | 10/2011 | G01F 23/284 |
| FR | 2 744 934 A1 | 8/1997 | |
| GB | 2 521 136 A | 6/2015 | |
| WO | WO 2010/144936 A1 | 12/2010 | |
| WO | WO 2017/174135 A1 | 10/2017 | |
| WO | WO-2017174135 A1 * | 10/2017 | H01Q 1/42 |

OTHER PUBLICATIONS

European Intention to Grant dated Dec. 21, 2020 in corresponding European Patent Application No. 18187126.0 (with English translation), 48 pages.

* cited by examiner

RADAR SENSOR FOR FILL LEVEL OR POINT LEVEL MEASUREMENT

CROSS-REFERENCE TO RELATED APPLICATIONS

This application claims the benefit of the filing date of European Patent Application No. 18 187 126.0 filed on 2 Aug. 2018, the entire content of which is incorporated herein by reference.

FIELD

The invention relates to the field of process automation in general. The invention specifically relates to a radar sensor for measuring a fill level and/or a point level of a product in a container.

BACKGROUND

Fill level gauges are used in general to measure the fill level of a product in a container or of bulk material on a bulk material pile. Radar-based fill level gauges emit radar signals in the direction of the surface of the product or of the bulk material, wherein a portion of the radar signal is reflected off the surface and can be received by the fill level gauge. The time of flight of the radar signal from the radar sensor to the surface and back is proportional to the length of the distanced traveled, so that the fill level can be determined based on the time of flight. Radar-based point level gauges, in general, involve ascertaining when a certain fill level and/or point level of the medium present in the container is reached.

So as to emit and/or receive the radar signal, the fill level and/or point level gauges generally comprise an antenna. The fill level and/or point level gauges are frequently provided on the containers in such a way that the antenna protrudes into the interior of the container. This regularly requires complex fixation of the radar sensor on the container and appropriate sealing of the fixation point. Radar sensors, and in particular the associated antennas, can also be installed at a certain distance with respect to the container. This design, however, may be subject to perturbations or a disturbance of the measurement due to environmental conditions, such as moisture on the container.

SUMMARY

By way of embodiments of the present disclosure, advantageously, an improved radar sensor for fill level and/or point level measurement can be provided. The radar sensor according to the disclosure can, in particular, be characterized by a compact design, robustness, durability, and increased measuring accuracy.

This is, in particular, made possible by the subject matter of the independent claims. Further advantageous embodiments will be apparent from the dependent claims and the description below.

One aspect of the disclosure relates to a radar sensor for measuring a fill level and/or a point level of a product and/or medium in a container. The container is a plastic container, for example, which is at least partially transparent to the radar signal of the radar sensor. The medium can be a liquid and/or a bulk material, for example. The radar sensor comprises a sensor, a sensor circuitry, a sensor unit, a sensor arrangement, a sensor assembly, and/or a sensor circuit for emitting and/or receiving a radar signal. The radar sensor furthermore comprises an evaluation circuitry for ascertaining and/or determining, based on the radar signal and/or based on a time of flight of the radar signal between the emission and reception of the radar signal, a measurement signal correlating with the fill level and/or the point level. Moreover, the radar sensor comprises a housing having at least one housing region which is configured to be arranged opposite a container wall of the container for measuring the fill level and/or the point level. In other words, the radar sensor can be configured so as to be attachable to the outside of the container wall of the container, so that the housing region is located opposite the container wall. The housing region and/or the housing are configured in such a way that the radar signal can be transmitted through the housing region and/or through the housing. An adhesive surface including an adhesive material, which is configured for attaching the radar sensor to the container wall of the container, and in particular in such a way that the housing region and/or the sub-region of the housing are disposed opposite the container wall, is disposed on the outside of the housing, at least along a portion of an outer circumference of the housing region and/or in at least one sub-region of the housing in which, for example, the housing region is disposed. The outer circumference can, for example, denote a region of the housing around the housing region. In other words, the adhesive surface can be disposed around the housing region. The adhesive surface can extend up to the housing region, be in contact therewith and/or be formed at least partially in the housing region. As an alternative, the adhesive surface can be disposed at a distance from the housing region and/or at least a portion thereof. Furthermore, a sealing surface including a sealing material which is configured to at least partially seal the housing region when the radar sensor is attached to the container wall, is disposed on the outside of the housing, at least along a portion of the outer circumference of the housing region and/or in at least one sub-region of the housing in which, for example, the housing region is disposed. The outer circumference can, for example, denote a region around the housing region. The sealing surface can extend up to the housing region, be in contact therewith and/or be formed at least partially in the housing region. As an alternative, the sealing surface can be disposed at a distance from the housing region and/or at least a portion thereof. As an alternative or in addition, the sealing surface can be configured to at least partially seal an area between the container wall and the housing region and/or protect this region with respect to environmental conditions. The outer circumference and/or sub-region in which the adhesive surface is disposed may be identical to or different from the outer circumference and/or sub-region in which the sealing surface is disposed.

As a result of the adhesive surface including the adhesive material, the radar sensor can be disposed, attached, and/or fixed reliably and permanently on the container wall of the container, without necessitating a further fixation device, such as a flange, on the radar sensor and/or without the need to adapt the container. In addition, as a result the sealing surface including the sealing material, the housing region of the housing through which the radar signal is transmitted, and/or the area between the housing and the container wall can be reliably protected against environmental conditions, such as an ingress of moisture or the like. In this way, it is possible to avoid disturbances and/or perturbations, which can impair the measurement. Overall, a compact, reliable, and robust radar sensor can thus be provided.

The housing region can, in general, be part of the housing, for example a portion of a housing surface, a housing surface, a housing side, a portion of a housing side, a portion of a housing wall, and/or a housing wall. The radar signal can be emitted and/or received through the housing region. Essentially, the housing region can denote an emission region and/or a reception region of the housing, of the radar sensor and/or of the antenna. The housing region and/or a housing wall in the housing region can have a wall thickness and/or a thickness of approximately 1 mm to 5 mm, for example. A wall thickness of the housing region may be less than a wall thickness of another sub-region of the housing.

The sensor of the radar sensor is configured to emit and/or receive the radar signal through the housing, and in particular through the housing region. The radar sensor may, in general, denote a transmission signal, which can be emitted by the radar sensor and/or the sensor in the direction of the product, and a reception signal, which can be reflected off the product and received by the sensor. The reception signal can denote the portion of the transmission signal reflected by the product. Essentially, the sensor can be equipped to emit the transmission signal in the direction of the product and/or to receive the reception signal reflected off the product. The sensor can comprise an antenna for this purpose. For example, a parabolic antenna, a horn antenna, a Cassegrain antenna, or a patch antenna may be used. The sensor can also comprise an antenna array, and the directivity of the antenna array can be adaptable, for example to achieve bundling.

The antenna of the sensor can be configured not only to emit the radar signal and/or the transmission signal, but also to receive the radar signal and/or the reception signal reflected off the product surface. For this purpose, the sensor can, for example, comprise a duplexer, which can be configured and/or equipped to discriminate the transmission signal and the reception signal in terms of time. However, it is also possible for the sensor to comprise different antennas for transmitting and receiving the radar signal.

The evaluation circuitry can, in general, denote evaluation electronics, an electronic evaluation circuitry, and/or an evaluation circuit. The evaluation circuitry is equipped to determine and/or ascertain a measurement signal correlating with the fill level and/or the point level, based on the time of flight and/or based on a time of flight measurement between the emission and reception of the radar signal. The measurement signal can denote at least one arbitrary parameter correlating with the point level and/or the fill level. The measurement signal and/or the at least one parameter can, in particular, be representative and/or indicative of the time of flight between the emission of the radar signal and the reception of the radar signal reflected off the product surface, of the fill level of the product in the container, of the point level of the product, of achieving the point level, and/or of exceeding a fill level or a point level.

The evaluation circuitry can use both analog and digital signal processing methods for determining the measurement signal. Accordingly, the evaluation circuitry can, for example, comprise an amplifier, a low-pass filter, a frequency mixer and/or a band-pass filter for analog signal processing. Furthermore, the evaluation circuitry can comprise one or more analog-to-digital converters, which are able to sample and quantize analog signals. In addition, the evaluation circuitry can comprise at least one processor for digital signal processing, for example a microprocessor, a digital signal processor or an application-specific instruction set processor (ASIP). Moreover, the evaluation circuitry can comprise at least one dedicated memory element for data and/or program code, in particular volatile or non-volatile memories. Furthermore, the electronic evaluation circuitry can comprise an application-specific integrated circuit (ASIC).

In summary, according to the first aspect, a radar sensor is provided, which can be disposed and/or attached on the outside of the container wall of the container by way of the adhesive surface and/or the adhesive material. No modifications whatsoever are needed for this on the container, such as the provision of an aperture. This allows a cost-effective attachment to and retrofitting of existing containers. Furthermore, the radar sensor comprises a sensor that is able to emit the radar signal and/or the transmission signal through the housing region of the housing and through the container wall, into an interior of the container. The radar signal (and/or reception signal) reflected off the medium present in the container and/or the surface thereof is likewise received by the sensor through the container wall and through the housing region of the housing. The housing region and/or an area between the housing region and a container wall is sealed by the sealing surface, which is, in particular, at least partially disposed between the housing (and/or the housing region) and the container wall, with respect to environmental conditions and/or perturbations.

The at least partially circumferential adhesive surface and/or the at least partially circumferential sealing surface essentially delimit the housing region (or the emission region and/or reception region) of the radar sensor measuring through the container wall with respect to the surrounding area. The container can, in principle, be made of any arbitrary material that is at least partially transparent to the radar signal, for example plastic material, such as high-density polyethylene (HDPE). In this way, for example, a formation of condensate and/or an ingress of undesirable media, such as water, into the region between the housing surface facing the container and/or the housing region of the radar sensor and the container surface (or container wall) facing the radar sensor can be prevented. If, for example, water penetrates into this region, this could result in total reflection of the emitted radar signal due to the high relative permittivity of water. In this case, it would no longer be possible to determine the fill level of the medium in the container. As a result of the design of the radar sensor, perturbations and/or faulty measurements can thus be avoided, the reliability of the radar sensor can be increased, and the usability of the radar sensor during the entire service life thereof at the installation site, for example in an outside application, can be ensured.

According to the disclosure, it is thus, in particular, provided to attach the radar sensor to the container wall of a container, such as a wall of a plastic container, and to seal the housing region of the housing of the radar sensor through which the radar signal is emitted and/or received, and/or an area between the housing region and the container wall, with respect to environmental conditions, wherein the radar sensor is able to measure the fill level and/or the point level through the housing of the radar sensor and through the container wall of the container. The sealing surface is disposed on the outside of the housing, so that sealing of the housing region can be achieved by the sealing surface outside the housing and/or outside the antenna of the sensor, between the container wall facing the radar sensor and the housing region of the radar sensor facing the container wall.

It shall be emphasized at this point that, in the context of the present disclose, the sealing surface can be provided by the adhesive surface, and vice versa. For example, the adhesive material can have sealing properties and/or be configured to be sealing. Analogously, the sealing material can have adhesive properties. In other words, the adhesive material can also provide the sealing material. As an alternative, the adhesive surface and the sealing surface can be configured separately and/or comprise at least partially different material. The portion of the outer circumference of the housing region and/or of the sub-region of the housing in which the adhesive surface is disposed can thus denote the portion of the outer circumference of the housing region and/or the sub-region of the housing in which the sealing surface is disposed. As an alternative, the portion of the outer circumference or sub-region in which the adhesive surface is disposed can differ at least partially from the portion of the outer circumference or sub-region in which the sealing surface is disposed.

The adhesive surface and/or the sealing surface can at least partially, and in particular completely, extend around the housing region, for example on the outside of the housing. As an alternative or in addition, the adhesive surface and/or the sealing surface can be formed at least partially, and in particular completely, in the housing region (such as on the outside of the housing region).

According to one embodiment of the disclosure, the adhesive surface and/or the sealing surface enclose the housing region completely along the outer circumference of the housing region and/or completely along the sub-region of the housing. In this way, it is possible to further improve not only how reliably the radar sensor is attached to the container by the adhesive surface, but also the seal of the housing region and/or of the area between the housing region and the container wall.

According to one embodiment of the disclosure, the adhesive surface extends at least partially, and in particular completely, around the sealing surface, for example on an outer circumference of the sealing surface.

According to one embodiment of the disclosure, the sealing surface is configured to be planar. As an alternative or in addition, the sealing surface can at least partially cover the housing region in a planar manner.

The sealing surface (and/or the sealing material) can essentially denote a filling (and/or a product) that at least partially fills an area between the housing region, the adhesive surface and the container wall. In such an embodiment as well, the adhesive surface can be configured integrally with the sealing surface. As an alternative, the adhesive surface and the sealing surface can have a multi-piece design. The adhesive surface can be disposed at a distance from the sealing surface or abut the same.

For example, the sealing material and/or the adhesive material can at least partially have a relative permittivity of 1.5 to 3. This can reduce a share of a portion of the radar signal reflected back in the direction of the radar sensor. In particular, this can improve the signal quality and/or discriminatory power of measurements in the close-up range of the radar sensor. Furthermore, a blocking distance, which can denote a close-up range of the radar sensor in which no measurement is possible, can be reduced compared to an air gap between the radar sensor and the container wall. Moreover, a distance between the housing region of the radar sensor facing the container and the container wall facing the radar sensor can be determined by a thickness of the sealing surface and/or adhesive surface. Since a thickness of the sealing material and/or adhesive material can be predetermined, the thickness and/or the physical properties of the sealing material and/or adhesive material (or the product provided thereby) can be taken into consideration in an antenna design, such as for the configuration of the radiation characteristics.

According to one embodiment of the disclosure, the sealing material of the sealing surface is provided by the adhesive material of the adhesive surface. In other words, the adhesive material may be identical to the sealing material. As an alternative or in addition, the adhesive surface and the sealing surface can be configured to be integral. In other words, the sealing material and the adhesive material can be the same material, which can exhibit both an adhesive property for fixation of the radar sensor and a sealing property for sealing of the housing region.

According to one embodiment of the disclosure, the adhesive material differs from the sealing material. In other words, the sealing material and the adhesive material can be different materials and/or different material combinations.

According to one embodiment of the disclosure, the adhesive surface and/or the sealing surface at least partially comprise an acrylate adhesive, and in particular an acrylate adhesive tape. The container can, for example, be a plastic container, such as for chemicals. These are frequently made of high-density polyethylene (HDPE), which is a low-energy plastic material. Acrylate adhesive can enable a reliable, lasting, and/or robust adhesive bond on such materials. An acrylate adhesive can also reliably seal the housing region. Acrylate adhesive can therefore be a particularly well-suited adhesive material and/or sealing material. The adhesive material and/or the sealing material can, in particular, comprise an acrylate adhesive tape, such as a double-sided acrylate adhesive tape and/or a closed-cell acrylate adhesive tape, which can be characterized, for example, by high adhesive and sealing properties.

According to one embodiment of the disclosure, the housing completely and/or permanently encloses and/or encases the sensor and the evaluation circuitry. In particular, the housing also encloses the antenna of the sensor. Moreover, the radar sensor can comprise further components, such as a communication circuitry and/or an energy supply unit, which can likewise be completely enclosed by the housing. The housing of the radar sensor can, in particular, be configured in such a way that it cannot be opened. In this way, it is avoided, for example, that unintentional opening of the housing allows aggressive gases or liquids to make contact with the sensor, the evaluation circuitry and/or other components. The housing permanently encasing the sensor and the evaluation circuitry can thus increase the safety and robustness of the radar sensor.

According to a further embodiment, the housing and/or the housing region of the radar sensor are configured to cause bundling of the radar signal emitted by the sensor. In particular, the material and the shape of the housing, such as of the housing region, can be configured to achieve a desired directivity of the radar sensor. For example, the housing and/or the housing region of the radar sensor can be configured so that the main lobe of the directivity is narrower than a predefined angle. Furthermore, the housing and/or the housing region of the radar sensor can be configured so that the side lobes are weaker than the main lobe by a predefined factor. As an alternative, the housing and/or the housing region can be configured so that the share of energy emitted via the main lobe is maximal. Strong bundling of the emitted radar signal can make it possible to reliably estimate and/or ascertain the fill level and/or point level even at low transmission power levels of the radar signal. Stronger bundling of the emitted radar signal can thus help achieve a reduction in energy consumption. In this way, a longer service life and/or operating time of the radar sensor can also be achieved.

According to one embodiment of the disclosure, the housing is completely closed. As an alternative or in addition, the housing encloses and/or encases the sensor and the evaluation circuitry hermetically, and in particular in a dust-tight, waterproof, and/or air-tight manner. For example, the housing of the radar sensor can be configured to achieve protection class IP68, that is, the housing of the radar sensor is dust-tight and offers protection against the ingress of water, even when permanently submerged. Moreover, the housing can be configured and/or configured to prevent gases from penetrating into the interior of the housing. This can be relevant, for example, in plants of the chemicals industry in which explosive or corroding gases can occur.

According to one embodiment of the disclosure, the radar sensor is configured to be completely cable-free to the outside. As an alternative or in addition, the housing does not include a cable feedthrough. In this way, the radar sensor can be operated completely self-sufficiently, at least temporarily, not connected by wire. This additionally allows an efficient and flexible attachment of the radar sensor to an arbitrary, including sometimes portable, container. This can also considerably reduce an installation complexity for installing the radar sensor.

According to a further embodiment, the housing of the radar sensor is integrally injection molded from plastic material. A housing integrally injection molded from plastic material can be particularly advantageous since this has no connecting points at which different housing components are joined to one another and where leaks could occur. Insert-molding the sensor, the evaluation circuitry, and/or further components of the radar sensor so as to form a one-piece housing can enable a safe and robust design of the radar sensor.

According to a further embodiment, the housing of the radar sensor comprises at least two housing components, wherein the at least two housing components are joined by way of welding and/or adhesive bonding. For example, the housing can be composed of two housing components, which are adhesively bonded using a suitable adhesive or joined by way of ultrasonic welding, so that the joining site is made of the fused material of the two housing components. Preferably, the at least two housing components are made of the same thermoplastic synthetic material (such as polyethylene or polypropylene.). As an alternative, the housing components can be made of different materials.

According to a further embodiment, the housing of the radar sensor is made completely of a thermoplastic synthetic material. This enables cost-effective production by way of injection molding. In particular, it is advantageous when the housing is made of a plastic material having low relative permittivity (1.5 to 3), such as polyethylene or polypropylene. Since the measurement of the radar sensor is carried out through the housing, this reduces ringing of the antenna, enhances the received signal quality in the close-up range, and thus reduces the blocking distance of the sensor. The blocking distance shall be understood to mean the distance within which no, or no reliable, measurement/evaluation of the received signals is possible.

According to one embodiment of the disclosure, the radar sensor furthermore comprises a communication circuitry, which is disposed in the housing and which is equipped to transmit the measurement signal and/or a measured value correlating with the measurement signal through the housing to a receiver. The communication circuitry of the radar sensor can be equipped to wirelessly transmit the measurement signal, at least one parameter correlating with the fill level and/or point level and/or the measured value through the housing, such as to a receiver. For this purpose, the communication circuitry can, in particular, use known communication standards, such as BLUETOOTH® (for example BLUETOOTH® Low Energy), ZIGBEE®, WI-FI®, (for example WI-FI® HaLow) or cellular mobile communications standards such as 2G, 3G or 4G (for example LTE Cat 0). The communication circuitry can also be equipped to provide an optical communication link. For example, the communication circuitry can thus comprise a BLUETOOTH® module, an infrared module, a radio module, and/or a wireless local area network (WLAN) module.

According to one embodiment of the disclosure, the radar sensor furthermore comprises a power supply, which is disposed in the housing and which is equipped to supply the sensor and the evaluation circuitry with electric energy. The communication circuitry and/or other components of the radar sensor can also be supplied with electric energy via the power supply. The power supply can comprise at least one battery for this purpose, wherein the battery can be exchangeable or not exchangeable.

According to a further embodiment, the power supply comprises a rechargeable battery. Furthermore, the power supply can comprise a charger for charging the rechargeable battery. The rechargeable battery can be used to supply the sensor, the evaluation circuitry and/or the communication circuitry with electric energy. By recharging the rechargeable battery using the charger, the operating time of the radar sensor can be extended.

The power supply can also comprise a device for ascertaining the charge state of the rechargeable battery. The radar sensor can be equipped to repeat the measurement of the fill level and/or point level in the container at certain time intervals, wherein the time interval can depend on the charge state of the rechargeable battery. In particular, the sensor can be equipped to emit the radar signal less frequently when the charge state of the rechargeable battery is low. Accordingly, the evaluation circuitry can be equipped to determine the measurement signal correlating with the fill level and/or point level, the measured value and/or the parameter less frequently when the charge state of the rechargeable battery is low and/or reaches a definable or predetermined threshold. Moreover, the communication circuitry can be configured to send the parameter, the measurement signal, and/or the measured value less frequently when the charge state of the rechargeable battery is low and/or reaches a definable or predetermined threshold.

According to a further embodiment, the charger of the power supply comprises a solar cell, and the housing of the radar sensor is configured to be translucent. For this purpose, for example, at least a portion of the housing can be made of a translucent plastic material, such as polyethylene or polypropylene. In this way, the operating time of the radar sensor can advantageously be increased and/or the radar sensor can be operated self-sufficiently over a long time period.

According to a further embodiment, the charger of the power supply comprises a generator for generating electric energy from vibrations. In this way, the operating time of the radar sensor can advantageously be increased and/or the radar sensor can be operated self-sufficiently over a long time period.

According to a further embodiment, the charger of the power supply comprises a receiver for wireless power transfer by way of electromagnetic induction. For example, the receiver can be compatible for wireless power transfer using the Qi standard. This enables efficient and safe charging of the power supply, without necessitating a cable for power transfer.

According to a further embodiment, the charger of the power supply comprises a thermoelectric generator for generating electric energy from spatial temperature differences. This can also advantageously increase the operating period of the radar sensor.

According to one embodiment of the disclosure, the radar sensor moreover comprises a magnetic switch, a magnet for actuating the magnetic switch, and a protective film for covering the adhesive surface and/or sealing surface. The protective film is joined to the magnet in such a way that peeling the protective film off the adhesive surface and/or the sealing surface results in removal of the magnet from the housing. Furthermore, the radar sensor is configured in such a way that the removal of the magnet from the housing switches the magnetic switch from a first switch state into a second switch state, wherein, in the first switch state, at least a portion of the sensor and/or evaluation circuitry is not supplied with energy by the power supply, such as a battery, of the radar sensor, and wherein a portion of the sensor and/or evaluation circuitry in the second switch state is supplied with energy by the power supply.

By providing the protective film, together with the magnet joined thereto, it can advantageously be ensured that the power supply does not become discharged during storage of the radar sensor. Furthermore, peeling off the protective film so as to activate the power supply can be used, on the one hand, to activate the power supply in a simple manner that is intuitive for a user and, on the other hand, to expose the adhesive surface and/or the sealing surface, which is provided and/or configured for attaching and/or sealing the radar sensor. In this way, it can be ensured that the radar sensor does not consume any energy, or only minimal energy, before being started up and/or attached at a measurement site, that is, before the protective film is peeled off, and that the power supply is automatically activated when the radar sensor is started up and/or attached at the measurement site, without the user having to take any further steps for start-up. By virtue of the activation of the power supply by way of the magnetic switch, the housing can advantageously also be configured to be completely closed, so that the components of the radar sensor disposed therein can be protected comprehensively and reliable against outside conditions.

The removal of the magnet from the housing causes the magnetic switch to switch from the first switch state into the second switch state. Here and hereafter, a magnetic switch is a switch that is switched and/or actuated by way of a magnetic field. The magnetic switch can be configured as a reed switch, for example. In particular, an electrical contact may be open in the first switch state, while the electrical contact is closed in the second switch state. The radar sensor can thus be configured in such a way that an electrical circuit is interrupted in the first switch state, while the electrical circuit is closed in the second switch state.

According to a further embodiment, the magnetic switch is a reed switch. The reed switch can comprise a magnetic reed, which is able to move when the magnet is removed from the housing, and thus from the magnetic switch. An electrical contact can be closed or opened by the movement of the magnetic reed. In other words, the reed switch can be maintained in an open or closed switch state by the magnetic field of the magnet joined to the protective film. The switch state can change when the magnet is removed from the magnetic switch in that the protective film is peeled off.

A reed switch can also comprise two magnetic reeds, which move relative to one another when the magnet is removed from the housing/magnetic switch. Furthermore, a second magnet can be disposed in the housing of the radar sensor, which maintains the reed switch in the second switch state as long as no magnetic field acts from outside the housing.

According to one embodiment of the disclosure, the radar sensor furthermore comprises a detachment structure disposed on the housing for non-destructively detaching the radar sensor from the container wall. The detachment structure can, in general, denote a structure of the housing, such as a reinforcement, a reinforced region, a configuration of the housing, and/or a device disposed on the outside of the housing. An operator or a user of the radar sensor can thus remove the radar sensor from the intended measurement site without the use of special tools after the measurement task has been completed or for recycling purposes. The detachment structure can be a prying-off device, for example, which is configured to apply a separating and/or peeling force to the adhesive surface and/or the sealing surface. In this way, the adhesive bond can be stressed beyond the mechanical load-bearing capacity thereof, so as to detach the adhesion. The use of a pry bar, screwdriver or the like may suffice. The prying-off device can be provided, for example, by a reinforced region and/or a reinforced edge of the housing. As an alternative or in addition, the housing can be shaped on the outside thereof in such a way that a torsional force can be applied the adhesive surface using an appropriate tool, and that the adhesion can be detached or pried open. The applied torque can be predominantly parallel to a surface normal of the adhesive surface. The housing of the radar sensor can be configured so as to be mechanically reinforced in the appropriate locations in order to absorb the shear forces and leverage that occur during the detachment process, without the housing being destroyed in the process. For example, at least two parallel lateral surfaces of the housing can be configured in such a way that the radar sensor can be sheared off the container wall using an adjustable wrench, pliers wrench, ring wrench, open-end wrench, or the like.

A further aspect of the present disclosure relates to the use of a radar sensor, as described above and hereafter, for measuring a fill level and/or point level of a medium in a container, and in particular in a plastic container. In particular, the radar sensor can be used in an outside application, that is, outdoors.

A further aspect of the disclosure relates to a sensor array comprising a radar sensor, as described above and hereafter. Furthermore, the sensor array comprises a container, such as a plastic container, including a container wall. The radar sensor is disposed with the adhesive surface on the outside of the container wall, so that the housing region of the radar sensor is disposed opposite the container wall, wherein the sealing surface and/or the adhesive surface of the radar sensor are at least partially disposed between the housing of the radar sensor and the container wall, and in particular between a portion of the housing region and the container wall.

Features, elements, and/or functions of the radar sensor, as described above and hereafter, can be features, elements, and/or functions of the sensor array, as described above and hereafter, and vice versa.

Exemplary embodiments of the disclosure will be described hereafter with reference to the figures.

BRIEF DESCRIPTION OF THE DRAWINGS

Similar, similarly acting, identical, or like-acting elements are denoted by similar or identical reference numerals in the figures. The figures are only schematic figures and not true to scale.

DETAILED DESCRIPTION OF EMBODIMENTS

Figure 1:
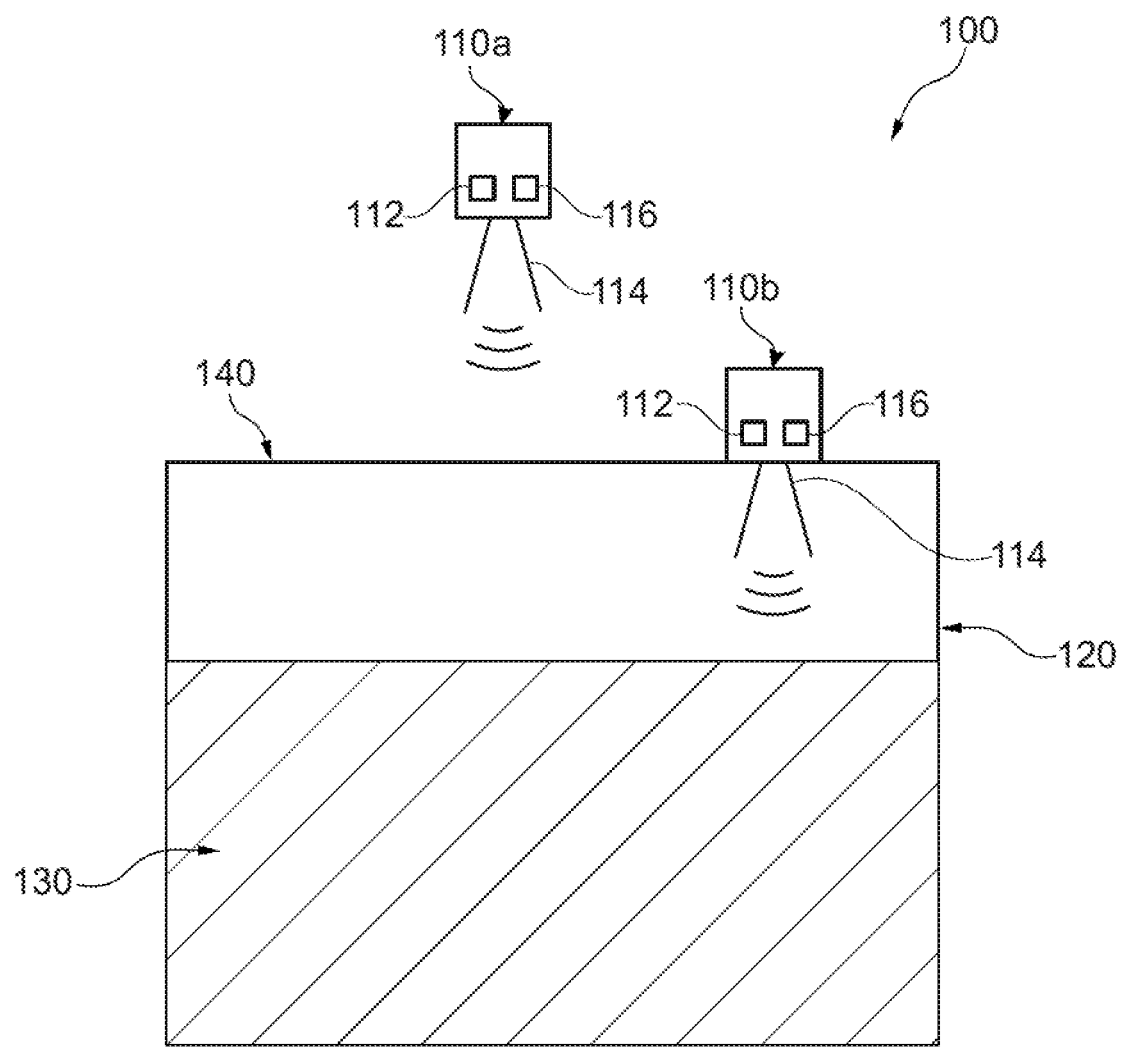
FIG. 1 schematically shows a sensor array comprising radar sensors according to an exemplary embodiment.

FIG. 1 schematically shows a sensor array 100 comprising radar sensors 101a, 110b according to an exemplary embodiment. The two radar sensors 110a, 110b are exemplary embodiments, which illustrate different attachments or arrangements of the radar sensors 110a, 110b on a container 120 of the sensor array 100.

The container 120 is at least partially filled with a medium 130, such as a liquid and/or a bulk material.

The radar sensors 10a, 110b comprise a sensor 112 including an antenna 114 for emitting and/or receiving a radar signal. The radar signal can be emitted as a transmission signal, and a portion of the radar signal reflected off the medium can be received as a reception signal. The radar sensors 110a, 110b furthermore comprise an evaluation circuitry 116 for ascertaining a measurement signal based on the radar signal and/or based on a time of flight measurement between the emission of the transmission signal and the reception of the reception signal. The measurement signal can correlate with or be representative of the fill level and/or the point level.

The radar sensor 110b for fill level measurement and/or point level measurement is installed in the container 120 and/or an upper side of the container 120 by being screwed in and/or flange-mounted thereon. The antenna 114 is thus located inside the container 120 and/or protrudes at least partially into the container 120. The evaluation circuitry 116 and/or further electronics of the radar sensor 110b are generally disposed outside the container 120. An appropriate seal can prevent the 20 egress of medium 130 from the container 120 in the region of the radar sensor 110b. Further devices and/or provisions can ensure that medium 130 is not able to penetrate into the radar sensor 110b via the antenna 114.

As an alternative, for example in the case of a plastic container 120, the radar sensor 110a can also be attached above the container 120, so that the measurement can take place through a container wall 140. However, it is possible, under appropriate ambient conditions, for condensate to form on the container 120 and/or the container wall 140 and/or for water or other media to collect in a depression on the container 120. In both instances, this may make the evaluation of the radar signals more difficult or even impossible.

Figure 2:
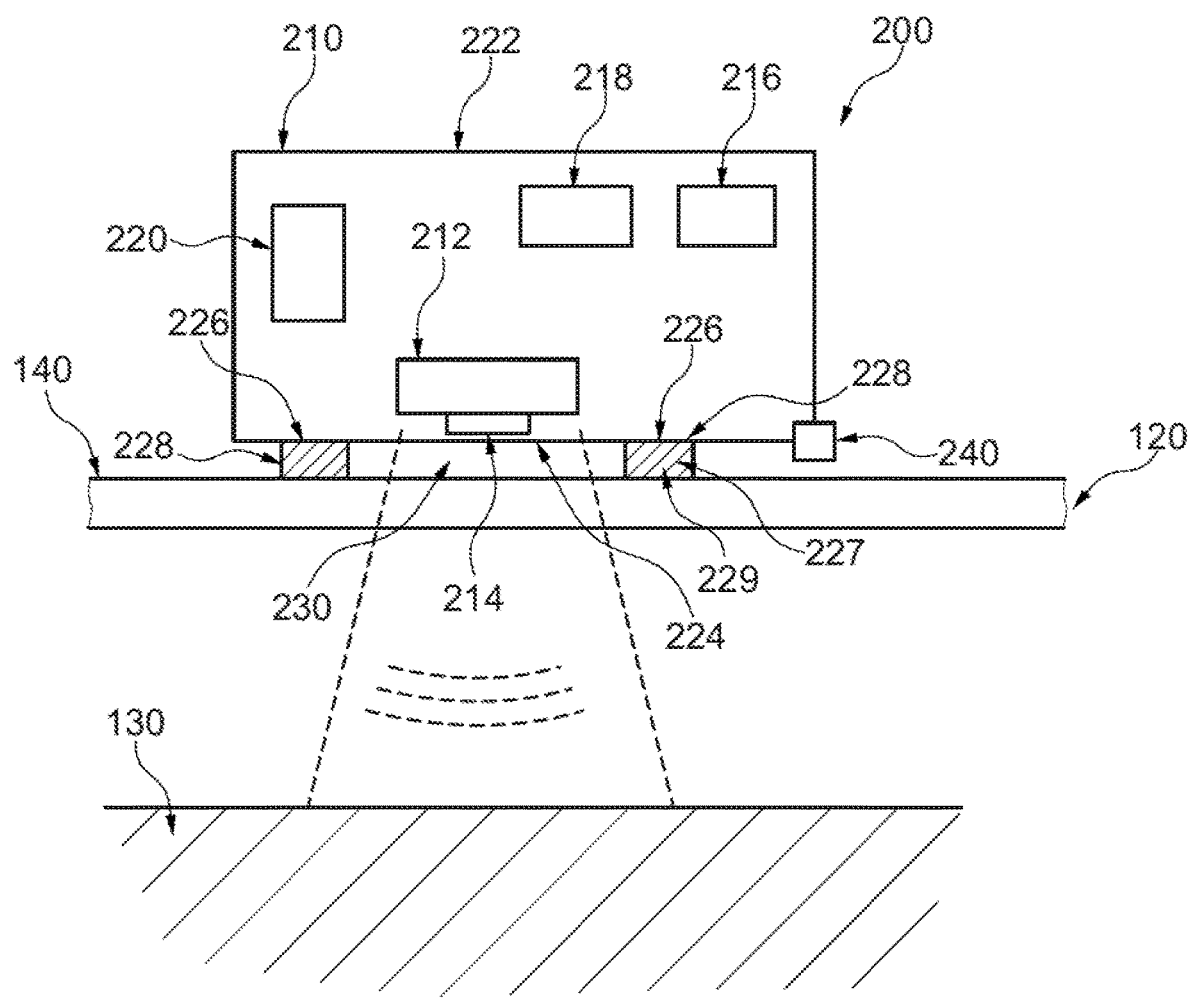
FIG. 2 to FIG. 5 each schematically show a sensor array comprising a radar sensor according to an exemplary embodiment of the disclosure.

FIG. 2 schematically shows a sensor array 200 comprising a radar sensor 210 and a container 120 according to an exemplary embodiment of the disclosure. Analogously to FIG. 1, the container 120 is at least partially filled with a medium 130 and comprises a container wall 140, which can form an upper side of the container 120, for example.

The radar sensor 210 comprises a sensor 212 including an antenna 214 for emitting and/or receiving the radar signal. Specifically, a transmission signal can be emitted, and a reception signal can be received, via the antenna 214, analogously to FIG. 1.

The radar sensor 210 furthermore comprise an evaluation circuitry 216 for ascertaining a measurement signal based on the radar signal and/or based on a time of flight measurement between the emission of the transmission signal and the reception of the reception signal. The measurement signal can correlate with or be representative of the fill level and/or the point level. The evaluation circuitry 216 can also ascertain a measured value, which can be representative and/or indicative of the fill level and/or the point level.

Moreover, the radar sensor 210 comprises a communication circuitry 218. The communication circuitry 218 is, in particular, equipped for wireless data transmission. For example, the measurement signal and/or the measured value can be wirelessly transmitted to a receiver via the communication circuitry 218. Data can also be received via the communication circuitry 218. The communication circuitry 218 can be a BLUETOOTH® module, a WLAN module, an infrared module, a radio module, or the like, for example.

Furthermore, the radar sensor 210 comprises a power supply 220, which can supply the sensor 212, the evaluation circuitry 216, the communication circuitry 218, and/or further components with electric energy. For example, the power supply 220 can comprise at least one battery.

Furthermore, the radar sensor 210 comprises a housing 222, which encloses, and in particular hermetically encases, the sensor 212, the antenna 214, the evaluation circuitry 216, the communication circuitry 218, and the power supply 220. The housing 222 can be made at least partially of plastic material.

The housing 222 comprises a housing region 224 through which the radar signal can be emitted and/or received. The housing region 224 can thus denote an emission and/or reception region 224 of the radar sensor 210 (or of the antenna 214). The housing region 224 can denote at least a portion of a housing side and/or of a housing wall. The radar sensor 210 is disposed on the container wall 140 in such a way that the housing region 224 is located opposite the container wall 140.

An adhesive surface 226 including an adhesive material 227 is disposed on the outside of the housing 222, at least along a portion of an outer circumference of the housing region 224 and/or a sub-region of the housing. In other words, the adhesive surface 226 can extend around the housing region 224 at least partially along the outer circumference of the housing region 224 and/or of the sub-region of the housing. The adhesive surface can extend up to the housing region, be in contact therewith, or be disposed at a distance therefrom. The radar sensor 210 is reliably attached to and/or fixed on the container wall 140 by way of the adhesive surface 226.

Furthermore, a sealing surface 228 including a sealing material 229 is disposed on the outside of the housing 222, at least along a portion of the outer circumference of the housing region 224 and/or in a sub-region of the housing. In other words, the sealing surface 228 can extend around the housing region 224 at least partially along the outer circumference of the housing region 224 and/or in the sub-region of the housing. The sealing surface can extend up to the housing region, be in contact therewith or be disposed at a distance therefrom. An area 230 between the housing region 224 and the container wall 140 can be reliably protected against environmental conditions, such as the ingress of media, by way of the sealing surface 228. In this way, perturbations can be avoided.

In the exemplary embodiment shown in FIG. 2, the adhesive material 227 is provided by the sealing material 229, and vice versa. The adhesive surface 226 and the sealing surface 228 are essentially configured to be integral. In other words, the adhesive surface 226 is provided by the sealing surface 228, and vice versa. For example, a sealing adhesive, such as an acrylate adhesive, for example in the form of a closed-cell double-sided acrylate adhesive tape, can be used as the adhesive material 227 and/or sealing material 229.

The adhesive surface 226 and/or the sealing surface 228 essentially delimit the area 230 between the housing region 224 of the radar sensor 210 facing the container 120 and the container wall 140 facing the radar sensor 210 with respect to the surrounding area. In this way, the formation of condensate or the ingress of undesirable media (such as water) can be prevented in this area 230, which can lead to faulty measurements and/or misinterpretation of the fill level of the medium 130. The adhesive surface 226 and/or the sealing surface 228 can comprise a closed-cell double-sided acrylate adhesive tape, for example.

The radar sensor 210 furthermore comprises a detachment structure 240 for detaching the radar sensor 210 from the container wall 140 in a largely non-destructive manner. The detachment structure 240 can, in general, denote a structure of the housing 222, such as a reinforcement, a reinforced region, an appropriately configured housing shape and/or a device disposed on the outside of the housing 222. An operator or a user of the radar sensor 210 can thus remove the radar sensor 210 from the intended measurement site without the use of special tools after the measurement task has been completed or for recycling purposes. The detachment structure 240 can be a prying-off device 240, for example, which is configured to apply a separating and/or peeling force to the adhesive surface 226 and/or the sealing surface 228. In this way, the adhesive bond can be stressed beyond the mechanical load-bearing capacity thereof, so as to detach the adhesion. The use of a pry bar, screwdriver or the like may suffice. The prying-off device 240 can be provided, for example, by a reinforced region 240 and/or a reinforced edge 240 of the housing 222, to which the corresponding tool can be applied. As an alternative or in addition, the housing 222 can be shaped on the outside thereof in such a way and/or be provided with one or more depressions and/or apertures, into which, for example, the corresponding tool can be at least partially inserted, so as to apply a torsional force to the adhesive surface 226 using an appropriate tool, and detach or pry open the adhesion.

The applied torque can be predominantly parallel to a surface normal of the adhesive surface 226. The housing 222 of the radar sensor 210 can be configured so as to be mechanically reinforced in the appropriate locations in order to absorb the shear forces and leverage that occur during the detachment process, without the housing 222 being destroyed in the process. For example, at least two parallel lateral surfaces of the housing 222 can be configured in such a way that the radar sensor 210 can be sheared off using an adjustable wrench, pliers wrench, ring wrench, open-end wrench, or the like.

Figure 3:
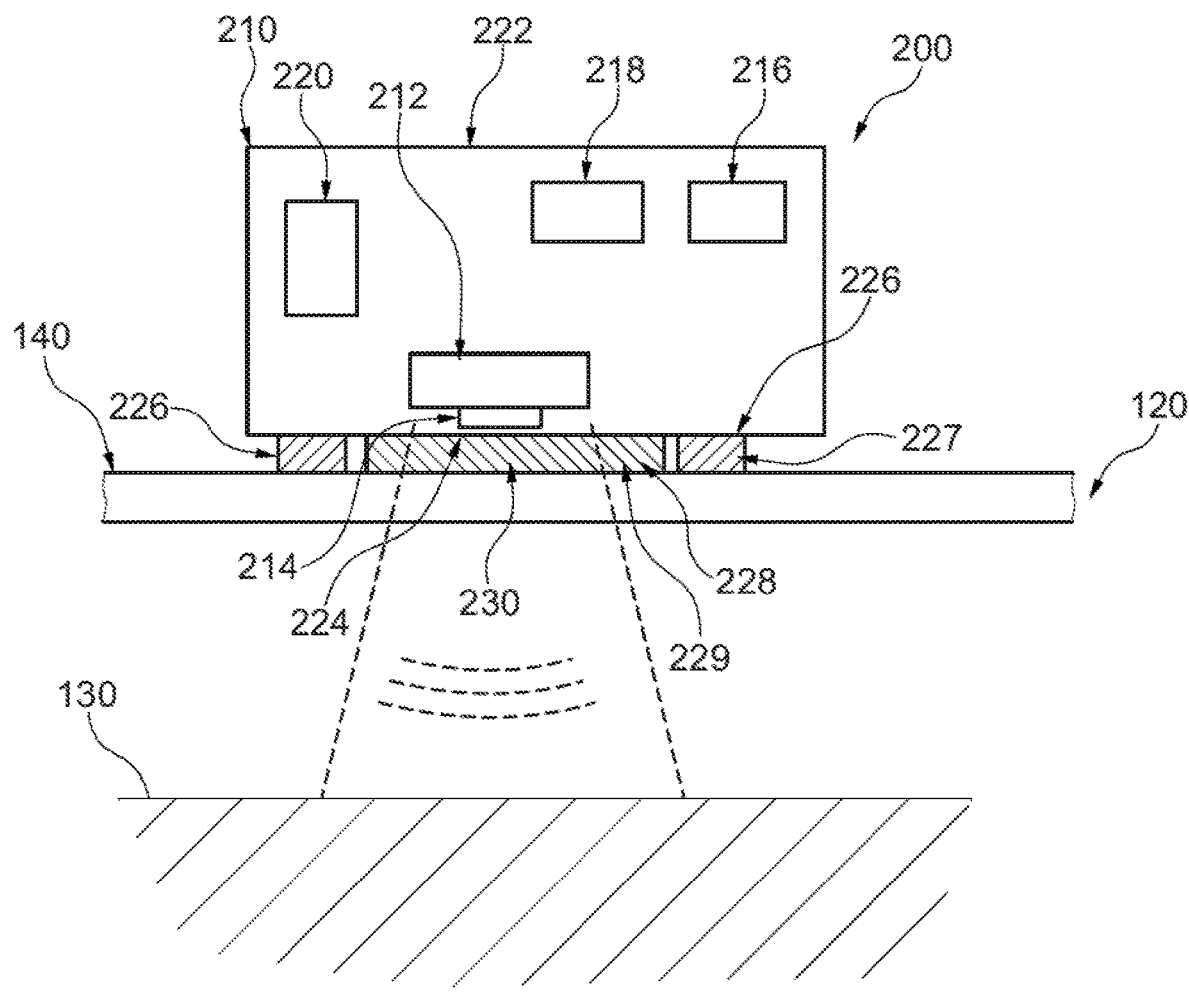

FIG. 3 shows a further exemplary embodiment of a sensor array 200 comprising a radar sensor 210 and a container 120. Unless described otherwise, the sensor array 200 and/or the radar sensor 210 of FIG. 3 comprises the same elements and features as the sensor array 200 and/or the radar sensor 210 of FIG. 2.

In the exemplary embodiment shown in FIG. 3, the adhesive surface 226 and the sealing surface 228 are configured separately. The adhesive surface 226 extends around the sealing surface 228 along an outer circumference. The sealing surface 228 furthermore at least partially covers the housing region 224 in a planar manner. The sealing surface 228 can thus be considered at least partially as a filling of the area 230 between the housing region 224 and the container wall 140. The area 230 can denote a volume which is formed between the adhesive surface 226, the housing region 224 facing the container 120 and the container wall 140 facing the radar sensor.

The sealing material 229 or filling material 229 may be a material, for example, having a relative permittivity that does not differ, or differs only to a small degree, from that of the container wall 140 and/or the housing region 224, which can be made of a plastic material. This may be the same material as the adhesive material 226; however, other materials and/or liquids having a corresponding relative permittivity, such as between 1.5 and 3, are also conceivable.

Figure 4:
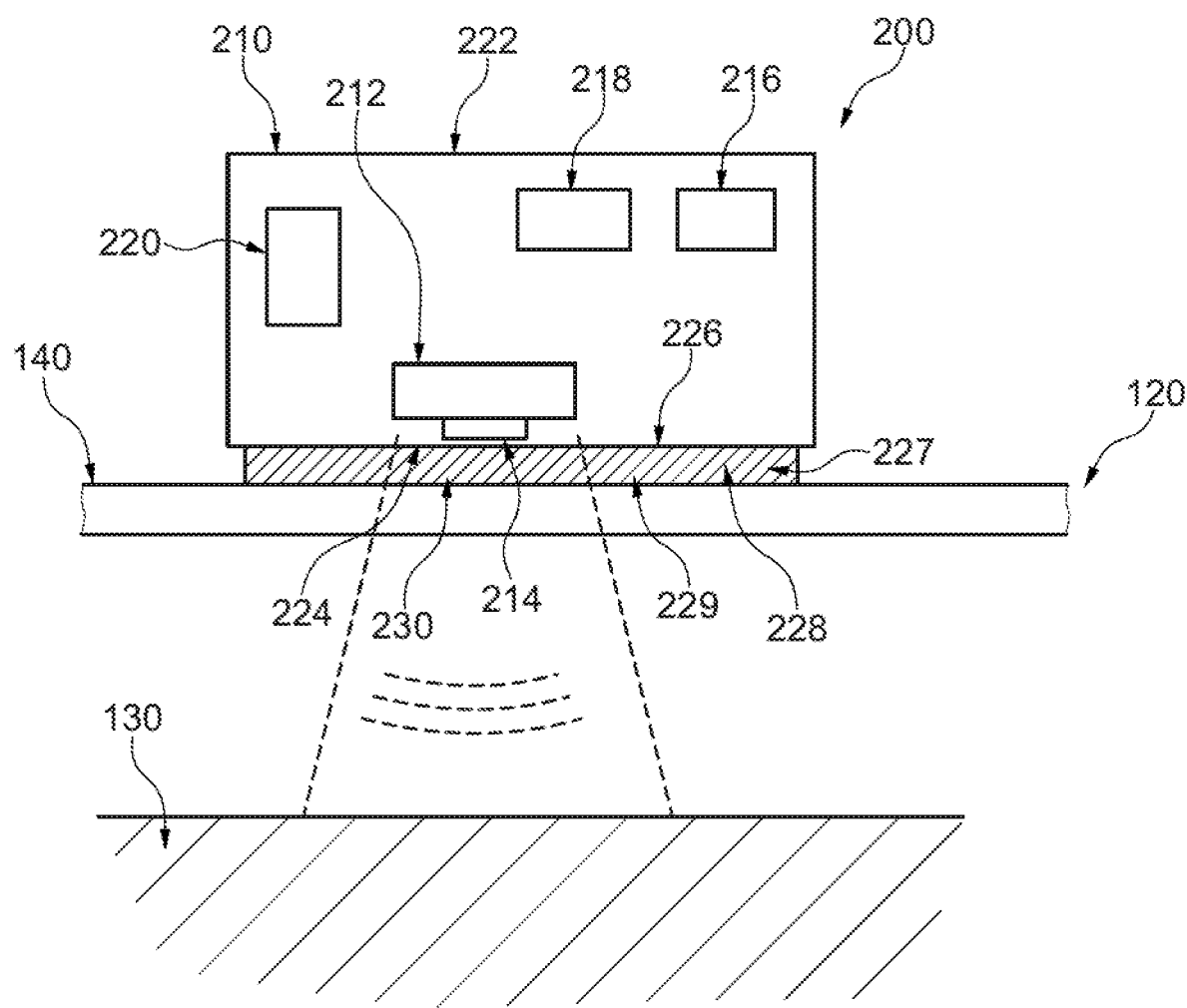

FIG. 4 shows a further exemplary embodiment of a sensor array 200 comprising a radar sensor 210 and a container 120. Unless described otherwise, the sensor array 200 and/or the radar sensor 210 of FIG. 4 comprises the same elements and features as the sensor arrays 200 and/or radar sensors 210 of FIGS. 2 and 3.

In the exemplary embodiment shown in FIG. 4, the adhesive surface 226 and the sealing surface 228 are configured to be integral. Again, the sealing surface 226 can be formed by the sealing surface 228, and vice versa. In other words, the adhesive surface 226 can have sealing properties, and the sealing surface 228 can have adhesive properties. The adhesive surface 226 and the sealing surface 228 can thus be made of one and the same material. This can considerably simplify production.

For example, the adhesive material 227 and/or the sealing material 229 can be a material having a relative permittivity of 1.5 to 3.0. By using a closed-cell double-sided acrylate adhesive tape, which has sealing properties, in this case the adhesive force of the radar sensor on the container wall 140 is further increased by an increase in the adhesive surface 226.

Figure 5:
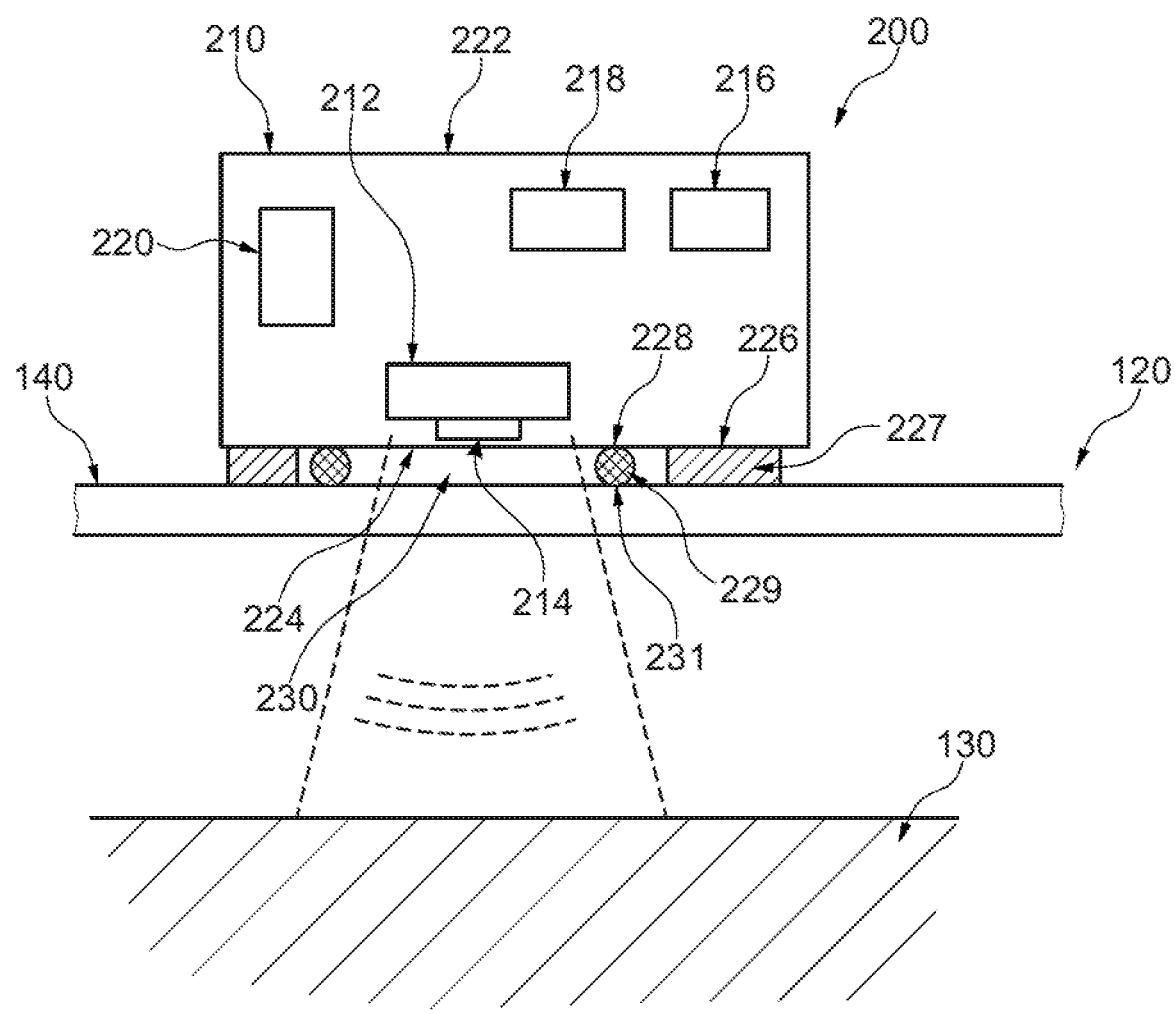

FIG. 5 shows a further exemplary embodiment of a sensor array 200 comprising a radar sensor 210 and a container 120. Unless described otherwise, the sensor array 200 and/or the radar sensor 210 of FIG. 5 comprises the same elements and features as the sensor arrays 200 and/or the radar sensors 210 of FIGS. 2 to 4.

In the exemplary embodiment of FIG. 5, it is possible that the adhesive surface 226 is not configured to extend completely around and/or does not have any sealing properties. For sealing the housing region 224 between the container wall 140 and the housing 222, an additional seal 231, for example made of an elastic material, such as fluoro rubber and/or an elastomer having comparable sealing properties, is disposed between the container wall 140 and the housing region 224. The seal 231 can extend at least partially around the housing region 224 and form the sealing surface 228 (or vice versa). The seal 231 and/or the sealing surface 228 can be configured in the shape of an O-ring, for example.

In addition, it shall be pointed out that "comprising" and "including" do not exclude other components or steps, and that the indefinite article "a" or "an" does not exclude the plural form. It shall furthermore be pointed out that features or steps that were described with reference to one of the above exemplary embodiments can also be used in combination with other features or steps of other exemplary embodiments described above. Reference numerals in the claims shall not be interpreted to have a limiting effect.

The invention claimed is:

1. A radar sensor for measuring a fill level and/or a point level of a product in a container, the radar sensor comprising:

a sensor configured to emit and to receive a radar signal;

evaluation circuitry configured to determine, based on the radar signal, a measurement signal correlating with the fill level and/or the point level;

a housing having at least one housing region, which is configured
- to be arranged opposite a container wall of the container for measuring the fill level and/or the point level, and
- such that the radar signal can be transmitted through the housing region;

an adhesive surface including an adhesive material, which is configured for attaching the radar sensor to the container wall of the container, the adhesive surface being disposed on an outside of the housing at least along a portion of an outer circumference of the housing region; and a sealing surface including a sealing material, the sealing surface being configured to at least partially seal the housing region when the radar sensor is attached to the container wall, wherein the sealing surface is disposed on the outside of the housing at least along a portion of the outer circumference of the housing region, wherein the sensor is further configured to emit and to receive the radar signal through the housing region, wherein the radar sensor is configured to be attached to the outside of the container wall of the container, such that the radar signal emitted by the radar sensor is transmitted from the outside of the container into the container through the container wall, wherein the adhesive surface and the sealing surface are configured separately, wherein the adhesive surface extends around the sealing surface along an outer circumference, wherein the sealing surface fills an area between the adhesive surface, the housing region facing the container, and the container wall facing the radar sensor, such that the area between the housing region and the container wall is sealed.

2. The radar sensor according to claim 1,
wherein the adhesive surface and/or the sealing surface completely encloses the housing region along the outer circumference of the housing region.

3. The radar sensor according to claim 1,
wherein the adhesive surface extends at least partially around the sealing surface.

4. The radar sensor according to claim 1,
wherein the sealing surface is planar, and/or
wherein the sealing surface at least partially covers the housing region in a planar manner.

5. The radar sensor according to claim 1,
wherein the sealing material of the sealing surface is provided by the adhesive material of the adhesive surface, and/or
wherein the adhesive surface and the sealing surface are integrally formed.

6. The radar sensor according to claim 1,
wherein the adhesive material is a different material than the sealing material.

7. The radar sensor according to claim 1,
wherein the adhesive surface and/or the sealing surface at least partially comprise an acrylate adhesive.

8. The radar sensor according to claim 1,
wherein the adhesive material and/or the sealing material has a relative permittivity of 1.5 to 3.

9. The radar sensor according to claim 1,
wherein the housing completely encloses the sensor and the evaluation circuitry.

10. The radar sensor according to claim 1,
wherein the housing is completely closed, and/or
wherein the housing encloses the sensor and the evaluation circuitry hermetically.

11. The radar sensor according to claim 1,
wherein the radar sensor is completely cable-free to an outside thereof, and/or
wherein the housing does not include a cable feedthrough.

12. The radar sensor according to claim 1, further comprising:
communication circuitry, which is disposed in the housing and is configured to transmit the measurement signal and/or a measured value correlating with the measurement signal through the housing to a receiver.

13. The radar sensor according to claim 1, further comprising:
a power supply, which is disposed in the housing and is configured to supply the sensor and the evaluation circuitry with electric energy.

14. The radar sensor according to claim 1, further comprising:
a detachment structure disposed on the housing and configured to detach the radar sensor from the container wall in a non-destructive manner.

15. A sensor array, comprising:
a radar sensor according to claim 1; and
a container including a container wall,
the radar sensor being disposed with the adhesive surface on an outside of the container wall so that the housing region of the radar sensor is disposed opposite the container wall, and
the sealing surface of the radar sensor being at least partially disposed between the housing of the radar sensor and the container wall.

16. The sensor array according to claim 15, wherein the sealing surface of the radar sensor is at least partially disposed between a portion of the housing region and the container wall.

* * * * *